(12) United States Patent
Inoue et al.

(10) Patent No.: US 11,124,128 B2
(45) Date of Patent: Sep. 21, 2021

(54) VEHICLE PERIPHERY DISPLAY SYSTEM, DISPLAY CONTROL DEVICE, AND RECORDING MEDIUM

(71) Applicant: PANASONIC INTELLECTUAL PROPERTY MANAGEMENT CO., LTD., Osaka (JP)

(72) Inventors: Masato Inoue, Kanagawa (JP); Masayoshi Michiguchi, Kanagawa (JP); Yuichiro Aihara, Kanagawa (JP); Yoshimasa Okabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 16/351,204

(22) Filed: Mar. 12, 2019

(65) Prior Publication Data
US 2019/0283687 A1 Sep. 19, 2019

(30) Foreign Application Priority Data
Mar. 15, 2018 (JP) .............................. JP2018-048535

(51) Int. Cl.
*B60R 11/04* (2006.01)
*B60R 11/02* (2006.01)

(52) U.S. Cl.
CPC .......... *B60R 11/0235* (2013.01); *B60R 11/04* (2013.01); *B60R 2300/30* (2013.01);
(Continued)

(58) Field of Classification Search
CPC ................. B60R 11/0235; B60R 11/04; B60R 2300/607; B60R 2300/30;
(Continued)

(56) References Cited

U.S. PATENT DOCUMENTS

| 10,179,544 B2* | 1/2019 | Endo | H04N 5/23293 |
| 2006/0274147 A1* | 12/2006 | Chinomi | G06T 3/4038 348/118 |

(Continued)

FOREIGN PATENT DOCUMENTS

JP 2017-024464 A 2/2017

OTHER PUBLICATIONS

U.S. Appl. No. 16/291,702 to Yoshimasa Okabe, which was filed Mar. 4, 2019.
(Continued)

*Primary Examiner* — Carolyn R Edwards
(74) *Attorney, Agent, or Firm* — Greenblum & Bernstein, P.L.C.

(57) ABSTRACT

A display control device generates a display image including an image obtained by reducing a predetermined range in a captured image based on an image captured by an image capturing device, and causes the display device to display the display image. In an adjustment mode, the display control device generates a computer graphics (CG) for allowing a user to set a range included in the display image and causes the display device to display the computer graphics. The CG indicates a range displayed in a reduced state and a range displayed without being reduced in a range included in the display image in different aspects.

17 Claims, 14 Drawing Sheets

(52) U.S. Cl.
CPC ... *B60R 2300/607* (2013.01); *B60R 2300/804* (2013.01); *B60R 2300/8026* (2013.01)

(58) Field of Classification Search
CPC ...... B60R 2300/804; B60R 2300/8026; B60R 2300/306; B60R 1/00; B60R 2300/20; B60R 2300/80; H04N 7/18
See application file for complete search history.

(56) References Cited

U.S. PATENT DOCUMENTS

| | | | | |
|---|---|---|---|---|
| 2007/0165108 | A1* | 7/2007 | Yuasa | B60R 1/00 348/148 |
| 2009/0079585 | A1* | 3/2009 | Chinomi | B60R 1/04 340/901 |
| 2011/0069169 | A1* | 3/2011 | Kadowaki | B62D 15/0275 348/148 |
| 2013/0307985 | A1* | 11/2013 | Numata | B62D 15/029 348/148 |
| 2014/0307091 | A1* | 10/2014 | Chang | B60R 1/00 348/148 |
| 2016/0349066 | A1* | 12/2016 | Chung | G01C 21/3658 |
| 2018/0154830 | A1* | 6/2018 | Tsuji | B60R 1/00 |
| 2018/0201192 | A1* | 7/2018 | Ishida | B60R 1/08 |
| 2019/0068898 | A1 | 2/2019 | Michiguchi | |
| 2019/0096261 | A1* | 3/2019 | Hayashi | H04N 7/183 |
| 2019/0100144 | A1* | 4/2019 | Asayama | G06K 9/00805 |
| 2019/0116315 | A1* | 4/2019 | Satomi | H04N 5/272 |

OTHER PUBLICATIONS

U.S. Appl. No. 16/291,871 to Yoshimasa Okabe, which was filed Mar. 4, 2019.
U.S. Appl. No. 16/351,164 to Yoshimasa Okabe, which was filed Mar. 12, 2019.

* cited by examiner

VEHICLE PERIPHERY DISPLAY SYSTEM, DISPLAY CONTROL DEVICE, AND RECORDING MEDIUM

BACKGROUND

1. Field

The present disclosure relates to a data processing technology, and more particularly, to a technology for displaying an image of the periphery of a vehicle.

2. Description of the Related Art

A driver needs to confirm a situation of the periphery of a vehicle with the naked eyes in order to safely drive the vehicle. In order to confirm an area that the driver cannot directly view with the naked eyes, side mirrors and the like have been used until now, but a camera monitoring system that captures an image of the situation of the periphery of the vehicle by an in-vehicle camera and displays the captured image on a monitor or the like may be installed in the vehicle.

(Patent Literature 1) Jpn. Pat. Appln. KOKAI Publication No. 2017-24464

In a conventional camera monitoring system, a driver can adjust a visual field range of an image of the periphery of a vehicle displayed on a monitor or the like in a vehicle cabin, but there is a case where it is difficult to know the visual field range.

SUMMARY

The present disclosure has been made in view of such a situation, and one object of the present disclosure is to provide a technology that supports appropriate setting of a visual field range of an image indicating a situation of the periphery of a vehicle.

In order to solve the above problems, according to one aspect of the present disclosure, a vehicle periphery display system includes: an image capturing device structured to capture an image of a periphery of a vehicle; a display control device structured to generate a display image including an image obtained by reducing a predetermined range in the image captured by the image capturing device; and a display device structured to display the display image generated by the display control device. In an adjustment mode, the display control device generates a computer graphics for allowing a user to set a range included in the display image and the display device displays the computer graphics, and the computer graphics indicates a first range and a second range in a range included in the display image in different aspects, the first range being displayed in a reduced state and the second range being displayed without being reduced.

Another aspect of the present disclosure is a vehicle periphery display system. This vehicle periphery display system includes: an image capturing device structured to capture an image of a periphery of a vehicle; a display control device structured to generate a display image including an image obtained by reducing a predetermined range in the image captured by the image capturing device; and a display device structured to display the display image generated by the display control device. In an adjustment mode, the display control device allows a user to set a first range and a second range as a range included in the display image, the first range being displayed in a reduced state and the second range being displayed without being reduced, and the display control device generates a computer graphics including both of an image indicating an aspect of the periphery of the vehicle corresponding to the first range in a reduced state and an image indicating an aspect of the periphery of the vehicle corresponding to the second range without reducing the aspect of the periphery of the vehicle corresponding to the second range, and the display device displays the computer graphics.

Still another aspect of the present disclosure is a display control device. This display control device includes: an acquirer structured to acquire an image captured by an image capturing device capturing art image of a periphery of a vehicle; a generator structured to generate a display image including an image obtained by reducing a predetermined range in the image captured by the acquirer; and an output structured to output the display image generated by the generator to a display device. In an adjustment mode, the generator generates a computer graphics for allowing a user to set a range included in the display image and the output outputs the computer graphics to the display device, and the computer graphics indicates a first range and a second range in a range included in the display image in different aspects, the first range being displayed in a reduced state and the second range being displayed without being reduced.

Still another aspect of the present disclosure is also a display control device. This display control device includes: an acquirer structured to acquire an image captured by an image capturing device capturing an image of a periphery of a vehicle; a generator structured to generate a display image including an image obtained by reducing a predetermined range in the image captured by the acquirer; and an output structured to output the display image generated by the generator to a display device. In an adjustment mode, a first range and a second range are set as a range included in the display image by a user, the first range being displayed in a reduced state and the second range being displayed without being reduced, and the generator generates a computer graphics including both of an image indicating an aspect, of the periphery of the vehicle corresponding to the first range in a reduced state and an image indicating an aspect of the periphery of the vehicle corresponding to the second range without reducing the aspect of the periphery of the vehicle corresponding to the second range, and the output outputs the computer graphics to the display device.

It should be noted that any combination of the components described above and expressions of the present disclosure converted between a method, a computer program, a recording medium in which a computer program is recorded, and a vehicle in which the present device is mounted, and the like, are effective as aspects of the present disclosure.

DETAILED DESCRIPTION

The invention will now be described by reference to the preferred embodiments. This does not intend to limit the scope of the present invention, but to exemplify the invention.

A vehicle periphery display system according to one embodiment can also be called a camera monitoring system, and presents an image obtained by capturing an image of a periphery of a host vehicle to an occupant (hereinafter, referred to as a driver). In a conventional vehicle periphery display system, there are problems that it is impossible to set a range displayed in a reduced (in other words, compressed) state depending on a driver's preference, it is difficult to know to what extent a range is displayed on a monitor, and in a case of adjusting a display range in a garage, a lane division line or another vehicle is not reflected, such that it is difficult to determine whether or not the adjustment of the display range is appropriate.

A vehicle periphery display system according to one embodiment provides a screen (hereinafter, also referred to as a "visual field range adjustment screen") for adjusting a range included in a display image in a periphery space of a vehicle, in other words, a range (hereinafter, also referred to as a "visual field range" or a "visual field range of the display image") reflected in the display image. The visual field range adjustment screen includes a computer graphics (hereinafter, referred to as a "CG") of contents that support appropriate adjustment of the visual field range. The CG in the embodiment is not an image captured in real time by an image capturing device, but is a virtual image (also referred to as a drawing) generated by a display control device. The CG in the embodiment includes an image of a lane division line or another vehicle assumed to be reflected in the display image.

Figure 1A:
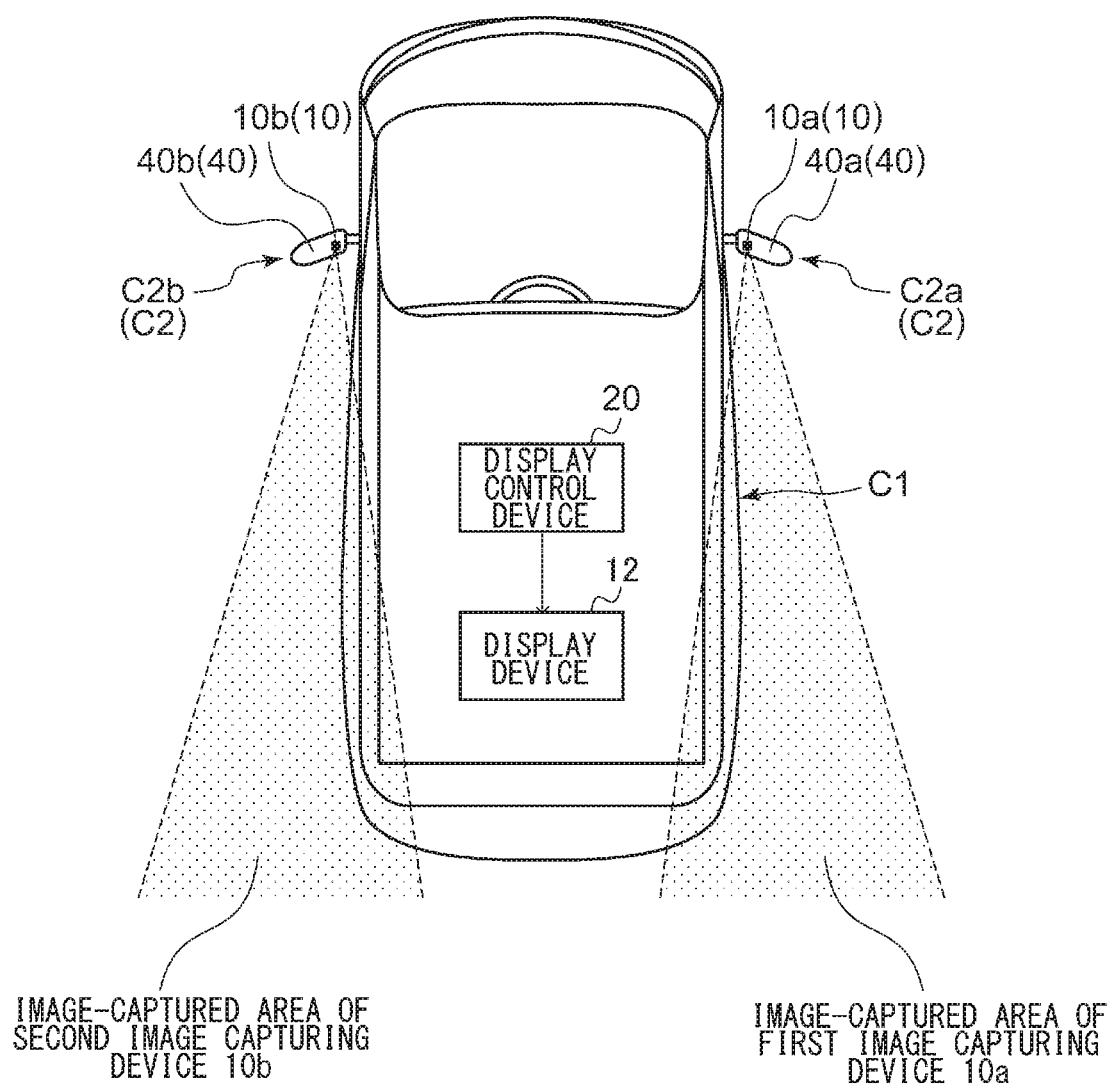
FIG. 1A is a diagram schematically illustrating a configuration of a vehicle according to one embodiment.
Figure 1B:
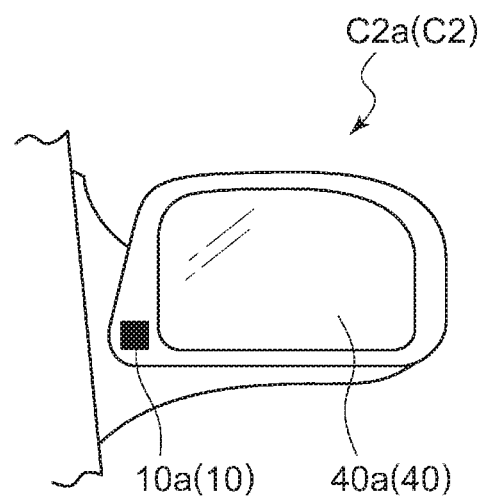
FIG. 1B is a diagram schematically illustrating a configuration of the vehicle according to the embodiment.

FIGS. 1A and 1B schematically illustrate a configuration of a vehicle C1 according to one embodiment. In particular, FIG. 1A illustrates an entire configuration of the vehicle C1. A vehicle periphery display system 22 to be described below is mounted on the vehicle C1. In the vehicle periphery display system 22, an image capturing device 10, a display control device 20, and a display device 12 cooperate with one another to present an image to be described below to a driver of the vehicle C1. The vehicle C1 includes a first side mirror C2a and a second side mirror C2b that are collectively called a side mirror C2, a first image capturing device 10a and a second image capturing device 10b that are collectively called the image capturing device 10, the display control device 20, and the display device 12. The first side mirror C2a is installed on a right side of the vehicle C1 and the second side mirror C2b is installed on a left side of the vehicle C1. In addition, the first image capturing device 10a and a first mirror 40a are mounted on the first side mirror C2a, and the second image capturing device 10b and a second mirror 40b are mounted on the second side mirror C2b. Here, the vehicle C1 is assumed to be a right-handle drive vehicle.

FIG. 1B illustrates a configuration of the first side mirror C2a of the vehicle C1. The first image capturing device 10a is disposed at a base portion of a body of the vehicle C1 in the first side mirror C2a. The second side mirror C2b also has the same structure as that of the first side mirror C2a. Returns to FIG. 1A. The first image capturing device 10a captures an image of the rear of the right side of the vehicle C1. An area image-captured by the first image capturing device 10a is indicated as an "image-captured area of the first image capturing device 10a". In addition, the second image capturing device 10b captures an image of the rear of the left side of the vehicle C1. An area image-captured by the second image capturing device 10b is indicated as an "image-captured area of the second image capturing device 10b". In addition, the vehicle periphery display system 22 displays the image captured by the image capturing device 10 on the display device 12. It should be noted that parts of side bodies of the vehicle C1 including door knobs are included in the "image-captured area of the first image capturing device 10a" and the "image-captured area of the second image capturing device 10b".

Figure 2:
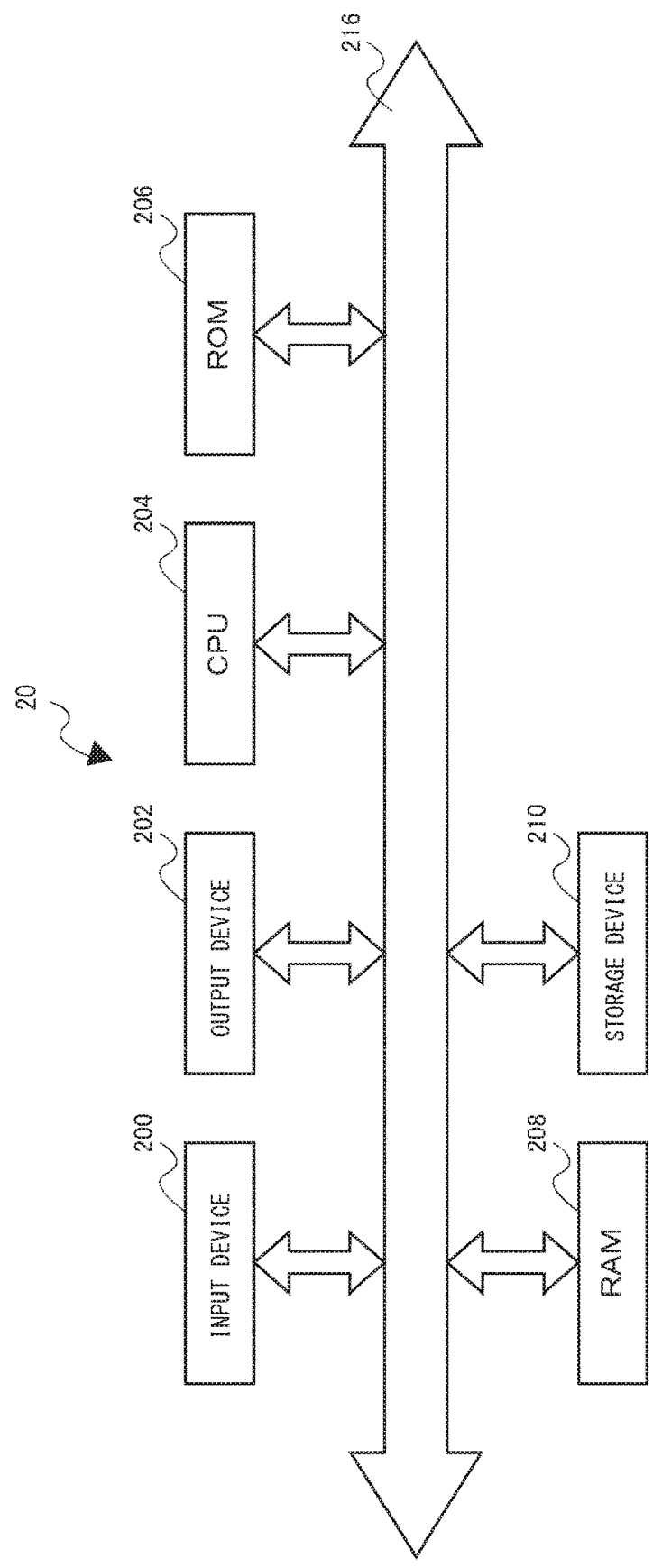
FIG. 2 is a view illustrating an example of a hardware configuration of a display control device illustrated in FIGS. 1A and 1B.

FIG. 2 illustrates an example of a hardware configuration of the display control device 20 in FIGS. 1A and 1B. The display control device 20 includes an input device 200, an output device 202, a central processing unit (CPU) 204, a read only memory (ROM) 206, a random access memory (RAM) 208, and a storage device 210, and these components are connected to each other through a bus 216. A computer program including a plurality of modules corresponding to a plurality of functional blocks (to be described below with reference to FIG. 3) of the display control device 20 may be installed in the ROM 206 or the storage device 210. The CPU 204 may perform functions of the respective functional blocks by reading the computer program into the RAM 208 and executing the computer program.

Figure 3:
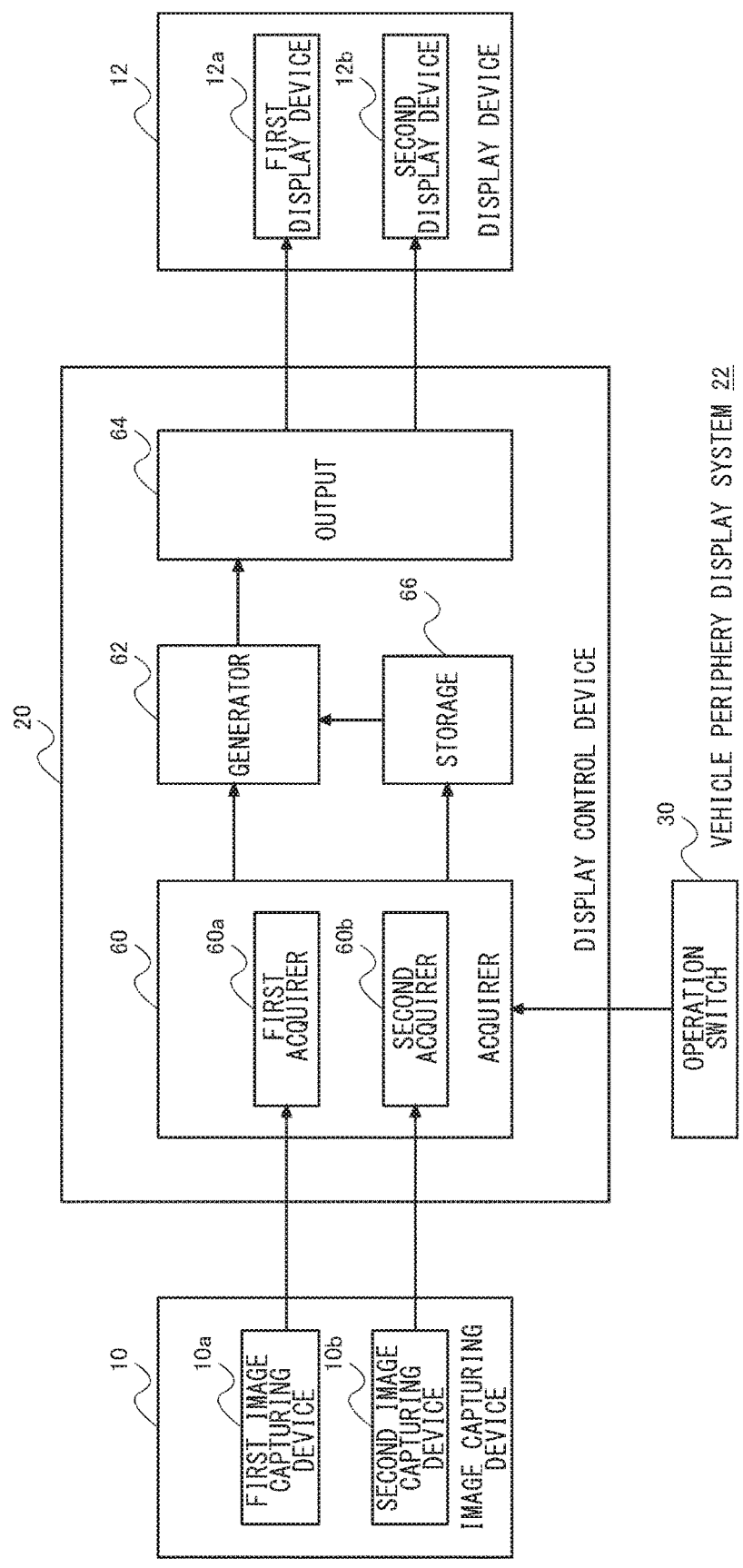
FIG. 3 is a block diagram illustrating a functional configuration of a vehicle periphery display system according to the embodiment.

FIG. 3 is a block diagram illustrating a functional configuration of the vehicle periphery display system 22 according to the embodiment. As partially described above, the vehicle periphery display system 22 includes the image capturing device 10, the display control device 20, the display device 12, and an operation switch 30. These devices may be connected to each other through a known in-vehicle network such as a media oriented systems transport (MOST) or a universal serial bus (USB).

The respective blocks illustrated in the block diagram of the present disclosure can be realized by elements such as CPUs and memories of computers or mechanical devices in terms of hardware, and can be realized by a computer program or the like in terms of software. However, here, functional blocks realized by cooperation between the hardware and the software are illustrated. It will be understood by those skilled in the art that these functional blocks can be realized in various forms by a combination of the hardware and the software.

As illustrated in FIG. 1A, the image capturing device 10 is a video camera that captures an image of the rear of the vehicle C1 and generates an image (including a video)

indicating the rear of the vehicle C1. The image capturing device 10 outputs the captured image (hereinafter, also referred to as a "captured image") to the display control device 20. The display control device 20 is an information processing device that generates a display image which is an image displayed on the display device 12 based on the image captured by the image capturing device 10. The display control device 20 may be realized by a single electronic control unit (ECU) or cooperation between a plurality of ECUs. The display image is also represented as a driving support image for supporting driving of the vehicle C1, and the display control device 20 is also represented as a driving support device.

The display device 12 displays the display image generated by the display control device 20 on a screen. The display device 12 includes a first display device 12a and a second display device 12b. The first display device 12a display the image captured by the first image capturing device 10a, and the second display device 12b displays the image captured by the second image capturing device 10b.

The display device 12 may also be used as a display of a car navigation device or the like (not illustrated) or may be a dedicated device of the vehicle periphery display system 22. The display device 12 displays the image on a touch screen, and inputs an operation for the touch screen to the display control device 20. Although the display device 12 according to the embodiment is provided inside the vehicle C1 (inside a vehicle cabin), the display device 12 may be provided instead of the mirror 40 of the side mirror C2 at a place of the mirror 40 of the side mirror C2. For example, the first display device 12a may be provided at a position of the first mirror 40a of the first side mirror C2a, and the second display device 12b may be provided at a position of the second mirror 40b of the second side mirror C2b.

The operation switch 30 receives inputs of various operations for the display control device 20. In the embodiment, the operation switch 30 is realized as a touch screen of the display device 12, but as a modified example, the operation switch 30 may be realized as hardware separate from the display device 12. An instruction of the driver is input to the display control device 20 through the operation switch 30, and the display control device 20 executes various types of information processing according to the instruction of the driver.

The display control device 20 will be described in detail. The display control device 20 includes a first, acquirer 60a and a second acquirer 60b that are collectively called an acquirer 60, a generator 62, an output 64, and a storage 66. The acquirer 60, the generator 62, and the output 64 may be realized by causing the CPU 204 of the display control device 20 to execute the computer program. In addition, the storage 66 may be realized by any one or a combination of the ROM 206, the RAM 208, and the storage device 210.

The acquirer 60 acquires the captured image output from the image capturing device 10. The acquirer 60 is constituted by, for example, a volatile memory and temporarily stores the image without processing the image, but may also perform a predetermined processing on the image. The first acquirer 60a acquires the image of the rear of the right side of the vehicle C1 captured by the first image capturing device 10a, and the second acquirer 60b acquires the image of the rear of the left side of the vehicle C1 captured by the second image capturing device 10b. The acquirer 60 outputs the acquired image to the generator 62.

The generator 62 generates a display image obtained by processing the captured image acquired by the first acquirer 60a. The output 64 outputs the display image to the first display device 12a to cause the first display device 12a to display the display image as a right rear image. In addition, the generator 62 generates a display image obtained by processing the captured image acquired by the second acquirer 60b. The output 64 outputs the display image to the second display device 12b to cause the second display device 12b to display the display image as a left rear image.

The storage 66 stores various data. For example, the storage 66 stores various types of setting information input through the operation switch 30. The generator 62 generates the display image depending on the setting information stored in the storage 66. The setting information includes, for example, information indicating a range (a visual field range to be described below) included in the display image in the captured image and information indicating a reduction range in the captured image.

Hereinafter, processing related to the captured image acquired by the second acquirer 60b and the display image displayed on the second display device 12b and processing related to adjustment of a visual field range of the display image will be described in detail. Processing related to the captured image acquired by the first acquirer 60a and the display image displayed on the first display device 12a and processing related to adjustment of a visual field range of the display image can be similarly realized.

The generator 62 generates the display image based on the captured image acquired by the acquirer 60. The display image in the embodiment includes at least a part of the captured image, and includes an image obtained by reducing a predetermined range of the captured image.

Figure 4:
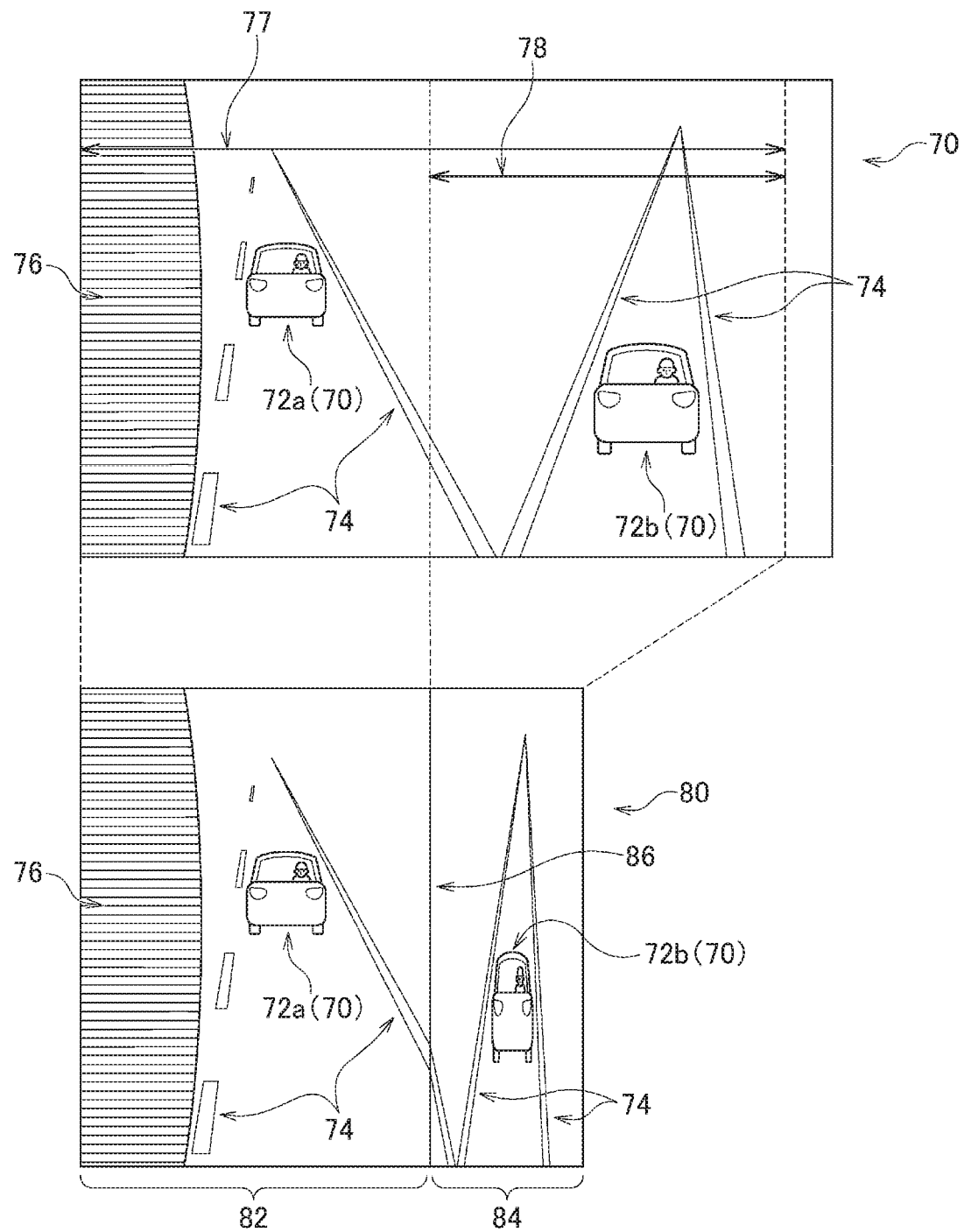
FIG. 4 is a diagram illustrating examples of a captured image and a display image.

FIG. 4 illustrates examples of a captured image and a display image. A captured image 70 indicates an aspect (state) of the rear and the side rear (left diagonal rear in FIG. 4) of the vehicle C1, and another vehicle 72 and a lane division line 74 (including a center line and a roadway outside line) are typically reflected in the captured image 70. Another vehicle 72a in FIG. 4 is an image of another vehicle traveling on a lane adjacent to a lane on which the vehicle including the image capturing device 10 travels, and another vehicle 72b is an image of another vehicle traveling on a road joining a road along which the vehicle including the image capturing device 10 travels. In addition, in the captured image 70, a host vehicle body 76 which is an image of a vehicle body (left side surface in FIG. 4) of the vehicle C1 itself is reflected.

In the display control device 20, a visual field range 77 which is a range included in a display image 80 in the captured image 70 and a reduction range 78 which is a reduction target in the captured image 70 are determined in an adjustment mode to be described below. The generator 62 of the display control device 20 reduces an image corresponding to the reduction range 73 of the captured image 70 in a transverse direction by a known method. In other words, the generator 62 of the display control device 20 compresses the image corresponding to the reduction range 78 in the transverse direction.

The display image 80 includes an equal magnification image 82 and a reduced image 84. The equal magnification image 82 is an image of an area excluding the reduction range 78 in the visual field range 77 of the captured image 70, and is an image displayed at an equal magnification without being reduced. The reduced image 84 is an image of an area corresponding to the reduction range 78 of the captured image 70 and is an image obtained by reducing the reduction range 78 of the captured image 70 in the transverse direction. In the reduced image 84, another vehicle 72b and the lane division line 74 reflected in the reduction range 78 of the captured image 70 are compressed in the transverse direction. That is, the generator 62 generates the display image 80 in which an image of a predetermined visual field range 77 in the captured image 70 is set, and generates the display image 80 including the reduced image 84 obtained by reducing an image of a predetermined reduction range 78 in the captured image 70.

The display control device 20 according to the embodiment has an operation state (hereinafter, also referred to as an "adjustment mode") for adjusting the visual field range of the display image, and switches the operation state from a normal mode to the adjustment mode depending on a driver's operation. The adjustment mode can also be called be a maintenance mode. In the adjustment mode, the generator 62 generates data of a visual field adjustment screen. The output 64 outputs the data of the visual field adjustment screen to the display device 12, and the display device 12 displays the visual field adjustment screen.

Figure 5:
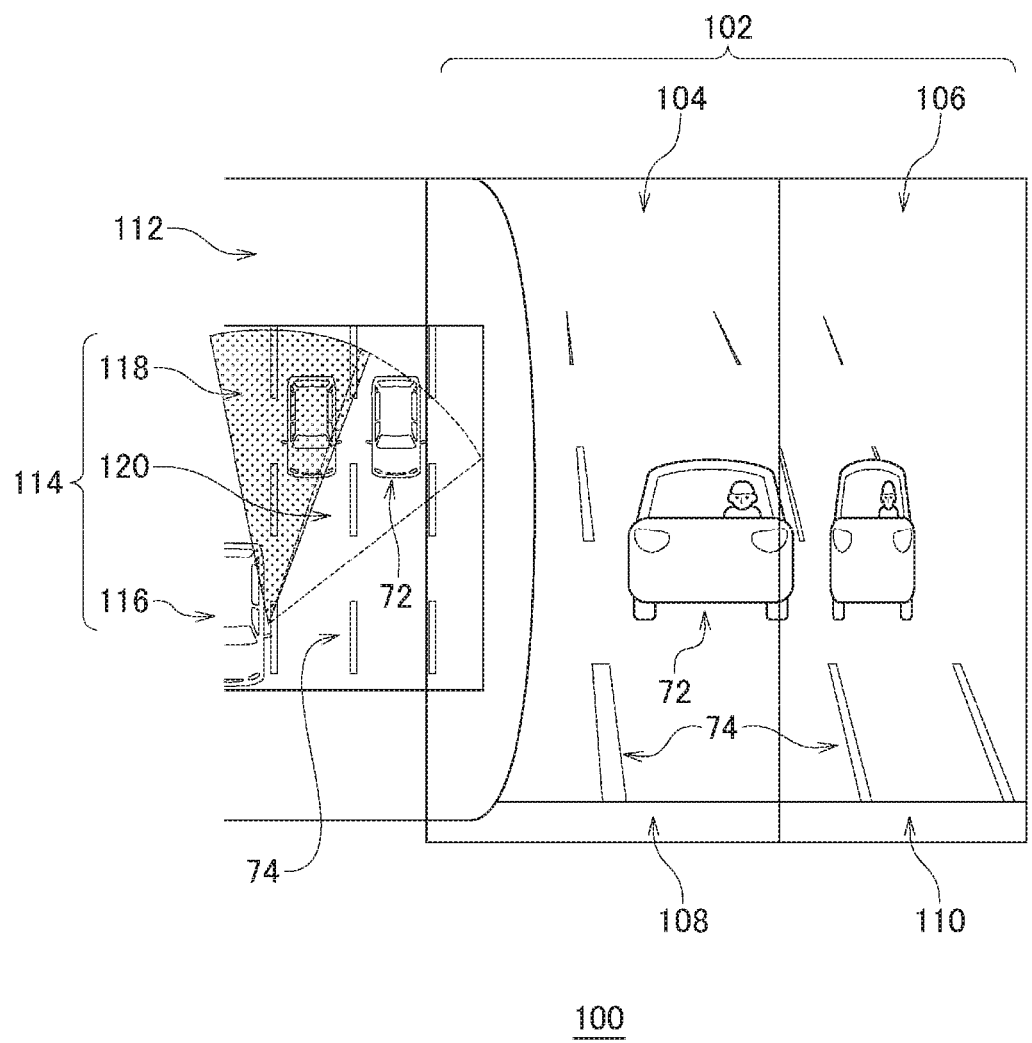
FIG. 5 is a view illustrating an example of a visual field range adjustment screen.

FIG. 5 illustrates an example of the visual field range adjustment screen. The visual field range adjustment screen 100 includes a bird's-eye view CG 114 which is a CG including a bird's-eye view for allowing a user to set the visual field range of the display image 80. In addition, the visual field range adjustment screen 100 includes a rear view CG 102 corresponding to a setting state of the bird's-eye view CG 114. The rear view CG 102 is a CG indicating a content of the display image 80 assumed based on the visual field range set by the driver with respect to the bird's-eye view CG 114. In addition, the visual field range adjustment screen 100 includes a host vehicle CG 112 which is a CG indicating a vehicle body of the vehicle C1 and corresponds to the host vehicle body 76 in the display image 80.

The rear view CG 102 of FIG. 5 indicates an aspect of the rear of the left side and the side rear (left diagonal rear) of the vehicle C1, and includes a lane division line 74 and another vehicle 72 on a lane. In addition, the bird's-eye view CG 114 indicates an aspect of the rear of the left side and the side rear (left diagonal rear) of the vehicle C1 viewed from above, and includes a lane division line 74 and another vehicle 72 on a lane. Therefore, even in a case of adjusting the visual field range in a garage in which another vehicle or the lane division line is not reflected on the image capturing device, it is possible to support appropriate setting of the visual field range. The generator 62 disposes the rear view CG 102 on the right side of the host vehicle CG 112, and disposes the bird's-eye view CG 114 on the host vehicle CG 112 so that the bird's-eye view CG 114 overlaps with the host vehicle CG 112. Therefore, it is possible to prevent visibility of the rear view CG 102 from being decreased by the bird's-eye view CG 114.

The bird's-eye view CG 114 includes a host vehicle indicator 116, an equal magnification range indicator 118, and a reduction range indicator 120. The host vehicle indicator 116 is a CG indicating an image of the vehicle C1 viewed from above, but may be a pre-stored photographic image. The equal magnification range indicator 118 is a fan-shaped image indicating, in a bird's-eye view form, a range displayed at an equal magnification without being reduced, in a range (that is, the visual field range) included in the display image 80. The reduction range indicator 120 is a fan-shaped image indicating, in a bird's-eye view form, a range displayed in a reduced state, in the range included in the display image 30, and is an image of an aspect different from that of the equal magnification range indicator 118. The generator 62 sets different appearances (different patterns, colors or the like) on the equal magnification range indicator 118 and the reduction range indicator 120.

The rear view CG 102 includes an equal magnification area CG 104 and a reduction area CG 106. The equal magnification area CG 104 is a CG indicating an aspect of the periphery (rear space of the left side in FIG. 5) of the vehicle C1 designated by the equal magnification range indicator 118 at an equal magnification without reducing the aspect of the periphery of the vehicle C1. In other words, the equal magnification area CG 104 is a CG indicating the aspect of the periphery of the vehicle C1 corresponding to the range indicated by the equal magnification range indicator 118 at the same size as that of the captured image.

The reduction area CG 106 is a CG indicating an aspect of the periphery (side rear space of the right side in FIG. 5) of the vehicle C1 designated by the reduction range indicator 120 in a reduced state. In other words, the reduction area CG 106 is a CG indicating the aspect of the periphery of the vehicle C1 corresponding to the range indicated by the reduction range indicator 120 at a size smaller than that displayed in the captured image. In the reduction area CG 106, another vehicle 72 is compressed in the transverse direction. In other words, a transverse width of another vehicle 72 is reduced. In addition, in the reduction area CG 106, the lane is compressed in the transverse direction. In other words, an interval between the lane division lines 74 in the transverse direction is reduced.

The generator 62 generates the rear view CG 102 including both of the equal magnification area CG 104 and the reduction area CG 106 when a range to be reduced within the visual field range is designated by a user's operation on the bird's-eye view CG 114. It should be noted that original data of the CGs arranged in the visual field range adjustment screen 100 may be stored in advance in the storage 66. The generator 62 may edit the original data of the CGs stored in the storage 66 depending on the user's operation or the like on the bird's-eye view CG 114, and dispose the CGs after the edition on the visual field range adjustment screen 100.

The generator 62 adds an equal magnification area indicator 106 which is an object indicating the range of the image that is not reduced and a reduction area indicator 110 which is an object indicating the range of the image that is reduced to the rear view CG 102. Specifically, the generator 62 adds the equal magnification area indicator 108 to a lower position of the equal magnification area CG 104, and adds the reduction area indicator 110 having an aspect (pattern, color or the like) different from that of the equal magnification area indicator 108 to a lower position of the reduction area CG 106.

The generator 62 sets an appearance (pattern, color or the like) of the equal magnification area indicator 108 to be the same as that of the equal magnification range indicator 118 of the bird's-eye view CG 114. In addition, the generator 62 sets an appearance of the reduction area indicator 110 to be the same as that of the reduction range indicator 120 of the bird's-eye view CG 114. Therefore, it becomes easy to allow the driver to intuitively recognize that the equal magnification range indicator 118 corresponds to the equal magnification area CG 104 and that the reduction range indicator 120 corresponds to the reduction area CG 106.

An operation of the vehicle periphery display system 22 having the configuration described above will be described.

The image capturing device 10 captures the image of the rear of the vehicle C1. When the display control device 20 is in the normal mode, the acquirer 60 acquires the image captured by the image capturing device 10. The generator 62 generates a display image in which a combination of an equal magnification image indicating a part of the captured image at an equal magnification and a reduced image indicating a part of the captured image in a reduced state are combined with each other depending on an equal magnification display range and a reduction display range stored in the storage 66. The output 64 outputs the display image to the display device 12, and the display device 12 displays the display image. The vehicle periphery display system 22 presents the image of the rear of the vehicle C1 to the driver by repeating this operation.

Figure 6:
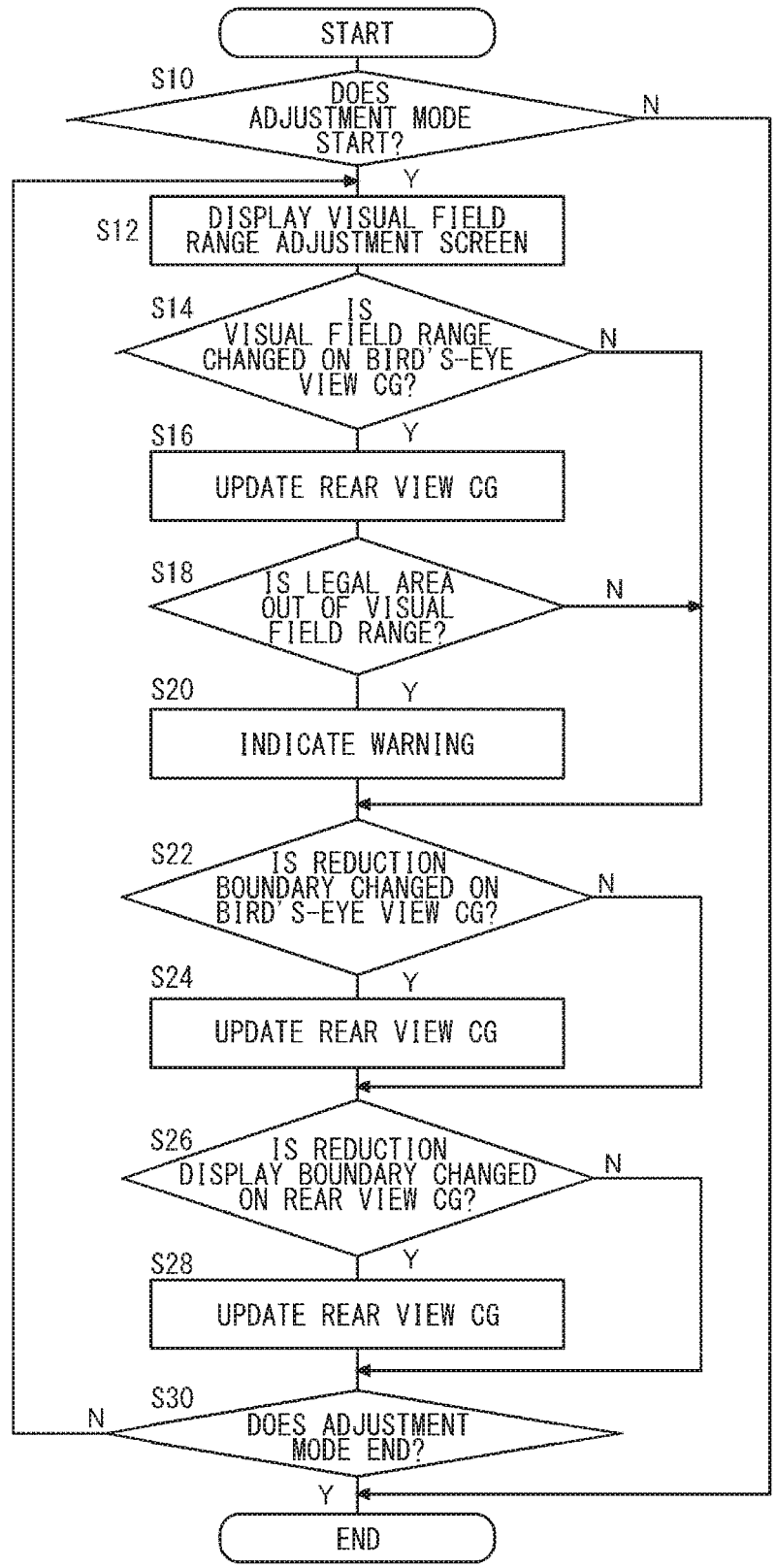
FIG. 6 is a flowchart illustrating operations of a display control device.

FIG. 6 is a flowchart illustrating operations of the display control device 20. The driver inputs an instruction to switch to the adjustment mode to the operation switch 30 in a case of adjusting the visual field range of the display image. When the instruction to switch to the adjustment mode is input, the display control device 20 shifts the operation state from the normal mode to the adjustment mode. When the operation state is shifted to the adjustment mode (Y of S10), the generator 62 generates the rear view CG 102, the bird's-eye view CG 114, and the host vehicle CG 112, and generates the visual field range adjustment screen 100 (see FIG. 5) in which these CGs are combined with one another. The output 64 outputs the visual field range adjustment screen 100 to the display device 12 to cause the display device 12 to display the visual field range adjustment screen 100 (S12).

Figure 7:
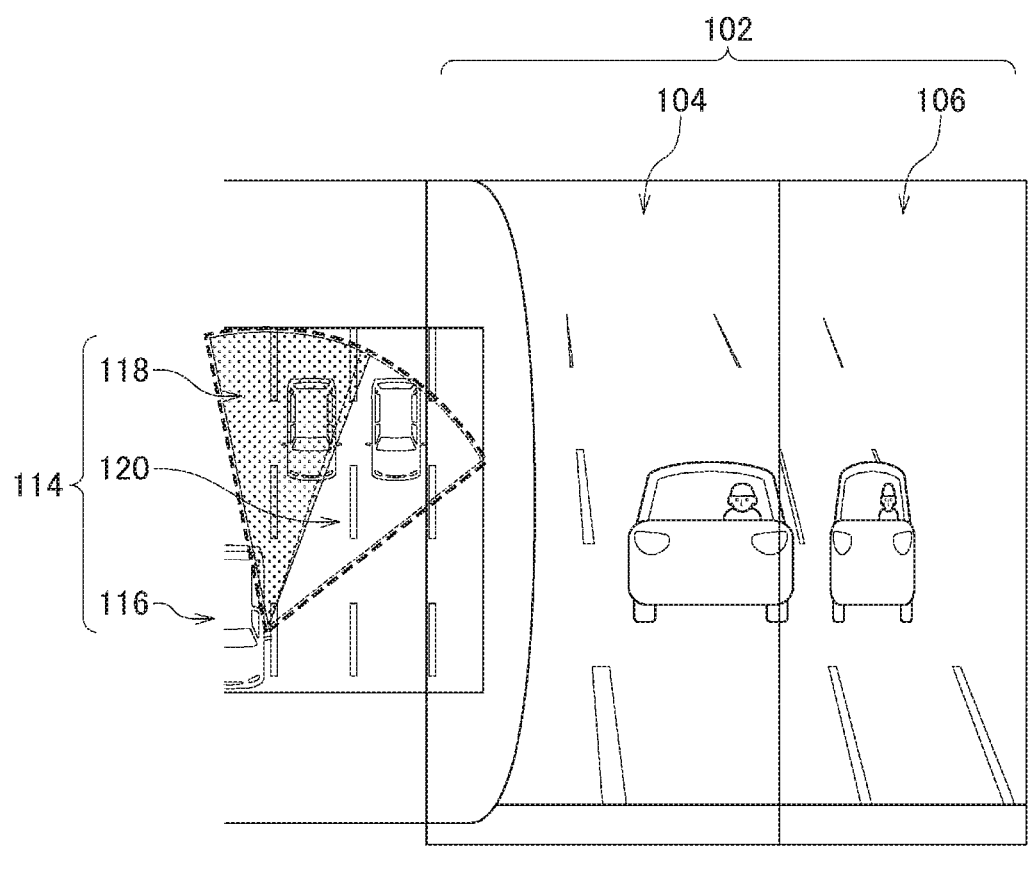
FIG. 7 is a view illustrating an example of the visual field range adjustment screen.

FIG. 7 illustrates an example of the visual field range adjustment screen 100. The user adjusts a range of the equal magnification range indicator 118 and a range of the reduction range indicator 120 (left and right ends of a fan shape indicated by broken lines, in other words, a position or an angle of the fan shape indicated by the broken lines) in the bird's-eye view CG 114 as a first step of the visual field range adjustment. As a result, the visual field range of the display image 80 is adjusted.

When a change operation of the visual field range, for example, an operation to change the ranges of the equal magnification range indicator 118 and the reduction range indicator 120 on the display device 12 is input (Y of S14), the generator 62 updates a content of the rear view CG 102 depending on the change operation (S16). For example, when the equal magnification range indicator 118 and the reduction range indicator 120 in FIG. 7 are displaced in a clockwise direction, the content of the rear view CG 102 is updated so that ranges reflected in the equal magnification area CG 104 and the reduction area CG 106 are displaced toward the left side of the vehicle C1.

Figure 8:
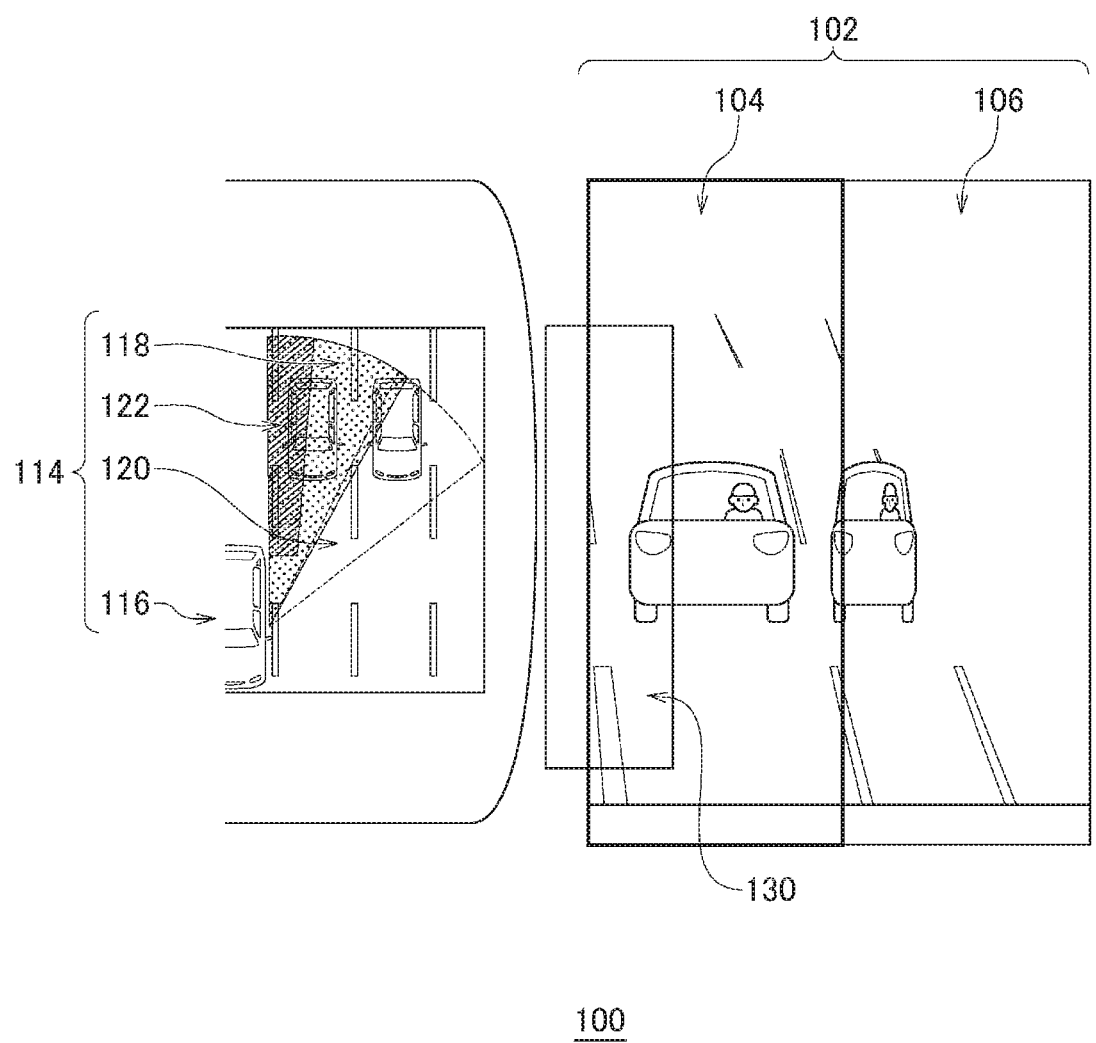
FIG. 8 is a view illustrating an example of the visual field range adjustment screen.

FIG. 8 illustrates an example of the visual field range adjustment screen 100. The storage 66 stores data of a predetermined area of a periphery space of the vehicle C1 that the camera monitoring system is to reflect. This area in the embodiment is an area defined by a predetermined law or rule (for example, the United Nations Rule UN-R46), and is hereinafter referred to as a "legal area". Data of the legal area may be coordinate values indicating a range of the legal area in a coordinate system of the periphery space of the vehicle C1. The generator 62 sets an object (legal area 122) indicating a legal area in a bird's-eye view in the bird's-eye view CG 114 and sets an object (legal area 130) indicating a legal area in the display image 80 in the rear view CG 102. As a modified example, an object indicating a legal area may be arranged in one of the bird's-eye view CG 114 and the rear view CG 102.

The generator 62 determines whether or not the visual field range of the display image set by the user includes the legal area, in other words, whether or not at least a part of the legal area is out of the visual field range. For example, the storage 66 may store a correspondence relationship between set ranges of the equal magnification range indicator 118 and the reduction range indicator 120 in the bird's-eye view CG 114 and coordinate values in the coordinate system of the periphery space of the vehicle C1. The generator 62 may determine whether or not the visual field range of the display image includes the legal area by comparing coordinate values of the set ranges of the equal magnification range indicator 118 and the reduction range indicator 120 with coordinate values of the legal area.

When a visual field range of the display image set in the bird's-eye view CG 114 does not include at least a part of the legal area, in other words, when at least a part of the legal area is out of the visual field range (Y of S18), the generator 62 sets the rear view CG 102 to a predetermined aspect indicating a warning (S20). The generator 62 according to the embodiment sets the equal magnification area CG 104 so as to make the inside of a frame of the equal magnification area CG 104 blink. A warning may be displayed by another mode. For example, a predetermined color indicating a warning may be set in the equal magnification area CG 104 (or the equal magnification area CG 104 and the reduction area CG 106).

Figure 9:
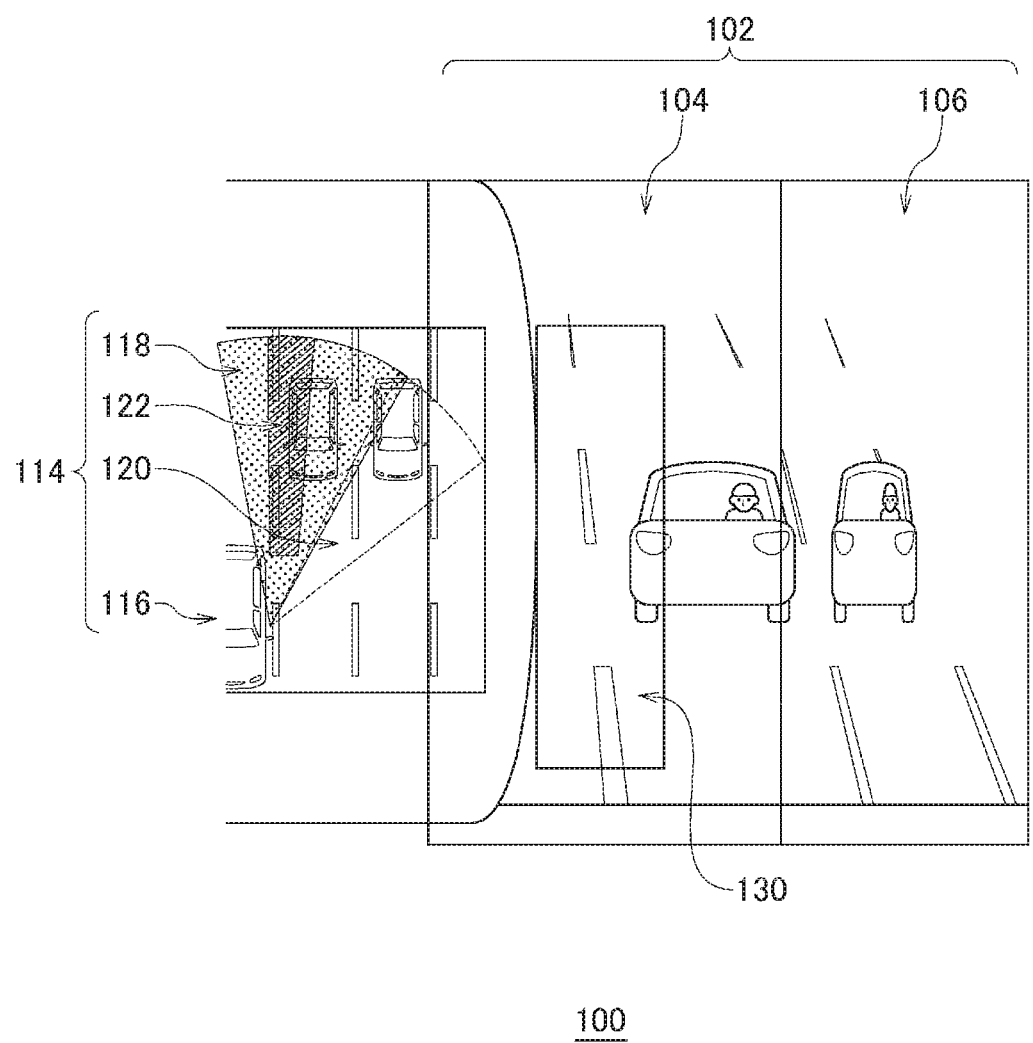
FIG. 9 is a view illustrating an example of the visual field range adjustment screen.

A user who sees the warning display adjusts positions of the equal magnification range indicator 118 and the reduction range indicator 120 so as to include the entire legal area 122. FIG. 9 illustrates an example of the visual field range adjustment screen 100. As illustrated in FIG. 9, when the visual field range of the display image set in the bird's-eye view CG 114 includes the entire legal area 122 (N of S18), S20 is skipped, that is, the warning display of the rear view CG 102 is not performed. When the change operation of the visual field range for the bird's-eye view CG 114 is not input (N of S14), S16 to S20 are skipped.

Figure 10:
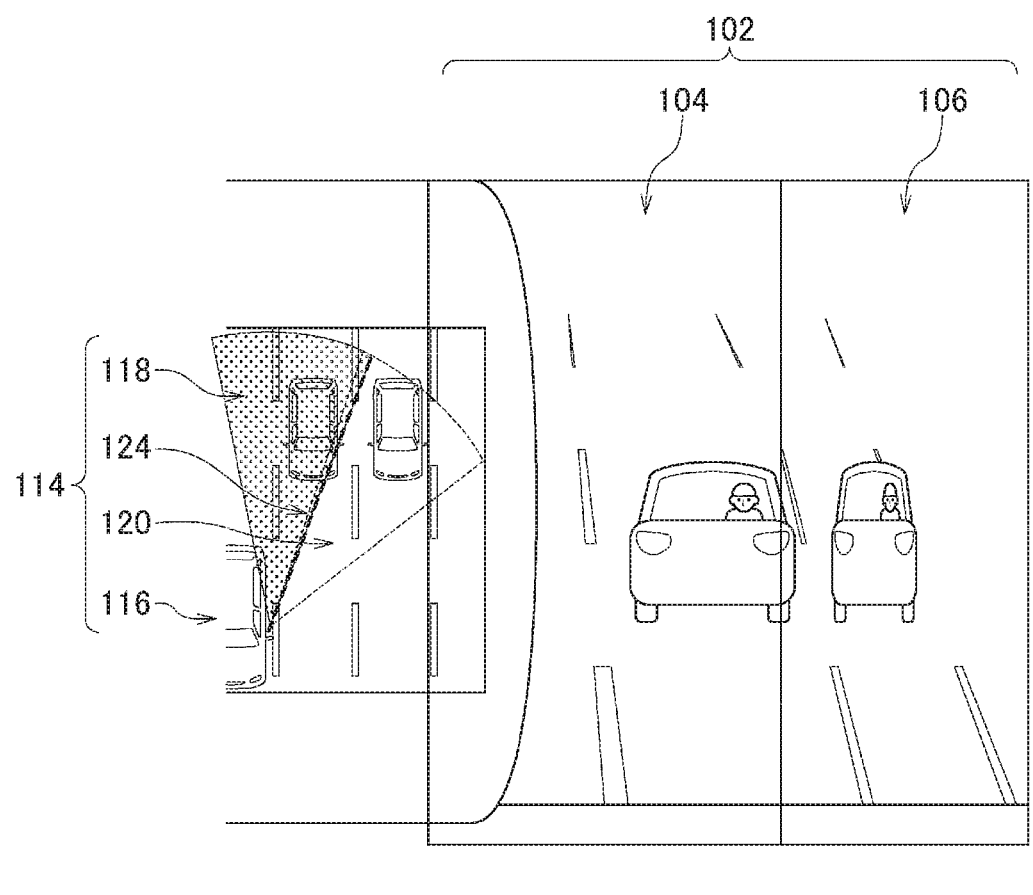
FIG. 10 is a view illustrating an example of the visual field range adjustment screen.

FIG. 10 illustrates an example of the visual field range adjustment screen 100. The user adjusts a reduction boundary 124 (boundary between the equal magnification range indicator 118 and the reduction range indicator 120 indicated by broken lines) on the bird's-eye view CG 114 as a second step of the visual field range adjustment.

When the reduction boundary 124 of the bird's-eye view CG 114 is changed (Y of S22), the generator 62 updates contents of the equal magnification area CG 104 and the reduction area CG 106 (S24) while maintaining sizes of the equal magnification area CG 104 and the reduction area CG 106 of the rear view CG 102 as they are. For example, an image obtained by reducing another vehicle 72 and the lane division line 74 corresponding to a range of the reduction range indicator 120 in a reduction ratio corresponding to a range of the reduction range indicator 120 after the change is set in the reduction area CG 106. When the reduction boundary is not changed on the bird's-eye view CG 114 (N of S22), S24 is skipped.

Figure 11:
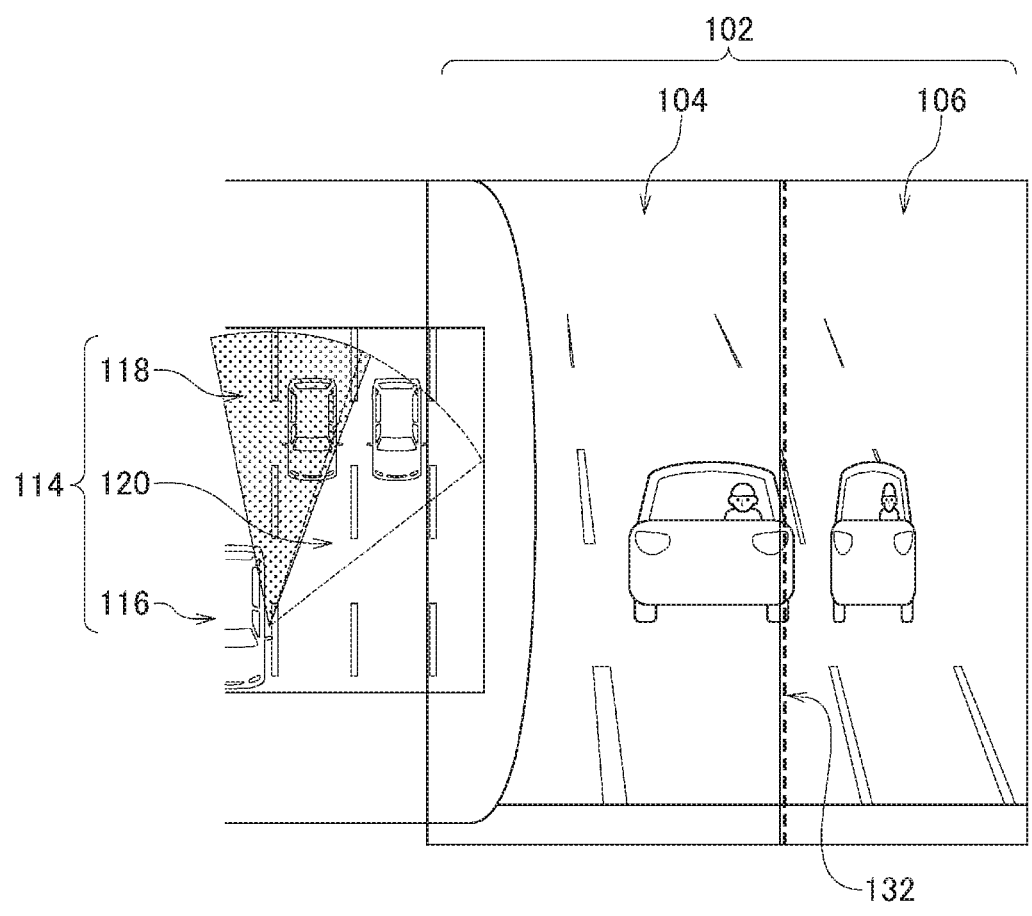
FIG. 11 is a view illustrating an example of the visual field range adjustment screen.

FIG. 11 illustrates an example of the visual field range adjustment screen 100. The user adjusts a position of a view reduction boundary 132 (boundary between the equal magnification area CG 104 and the rear view CG 102 indicated by the broken line) on the rear view CG 102 as a third step of the visual field range adjustment.

When the position of the view reduction boundary 132 of the rear view CG 102 is changed (Y of S26), the generator 62 updates a content of the rear view CG 102 depending on the change operation (S28). For example, the generator 62 changes the sites of the equal magnification area CG 104 and the reduction area CG 106 depending on the change of the view reduction boundary 132. In addition, the generator 62 determines a reduction ratio depending on the size of the reduction area CG 106 after the change and a reduction range indicated by the reduction range indicator 120. The generator 62 sets an image obtained by reducing another vehicle 72 and the lane division line 74 corresponding to a range of the reduction range indicator 120 in the determined reduction ratio in the reduction area CG 106.

When the view reduction boundary 132 of the rear view CG 102 (N of S26) is not changed, S23 is skipped. When an end instruction of the adjustment mode is input from the operation switch 30 (Y in S30), the display control device 20 ends the adjustment mode to return the operation state to the normal mode. When the adjustment mode is continued (N in S30), the processing returns to S12. When the shift operation to the adjustment mode does not input (N of S10), processes after S12 are skipped, such that a flow of FIG. 11 ends.

According to the vehicle periphery display system 22 according to the embodiment, by displaying the bird's-eye view CG 114 and the rear view CG 102 in the adjustment mode, it is possible to allow the driver to intuitively grasp the visual field range in a current adjustment state at the time of adjusting the visual field range of the display image. In addition, even when the vehicle C1 is stored in the garage and the image capturing device 10 cannot capture an image of a road or another vehicle, it is possible to support appropriate adjustment of the visual field range of the display image by the display of the CG.

Hereinabove, the present disclosure has been described based on the embodiment. It will be understood by those skilled in the art that this embodiment is illustrative and various modifications can be made to combinations of the respective components or the respective processing processes of the embodiment and that these modifications also fall within the scope of the present disclosure.

A first modified example will be described. In the embodiment, another vehicle 72 and the lane division line 74 are displayed in the equal magnification area CG 104, the redaction area CG 106, and the bird's-eye view CG 114, but as a modified example, one or both of grids (in other words, grid patterns or lattice patterns) and geometric figures may be displayed in the equal magnification area CG 104, the reduction area CG 106, and the bird's-eye view CG 114.

Figure 12:
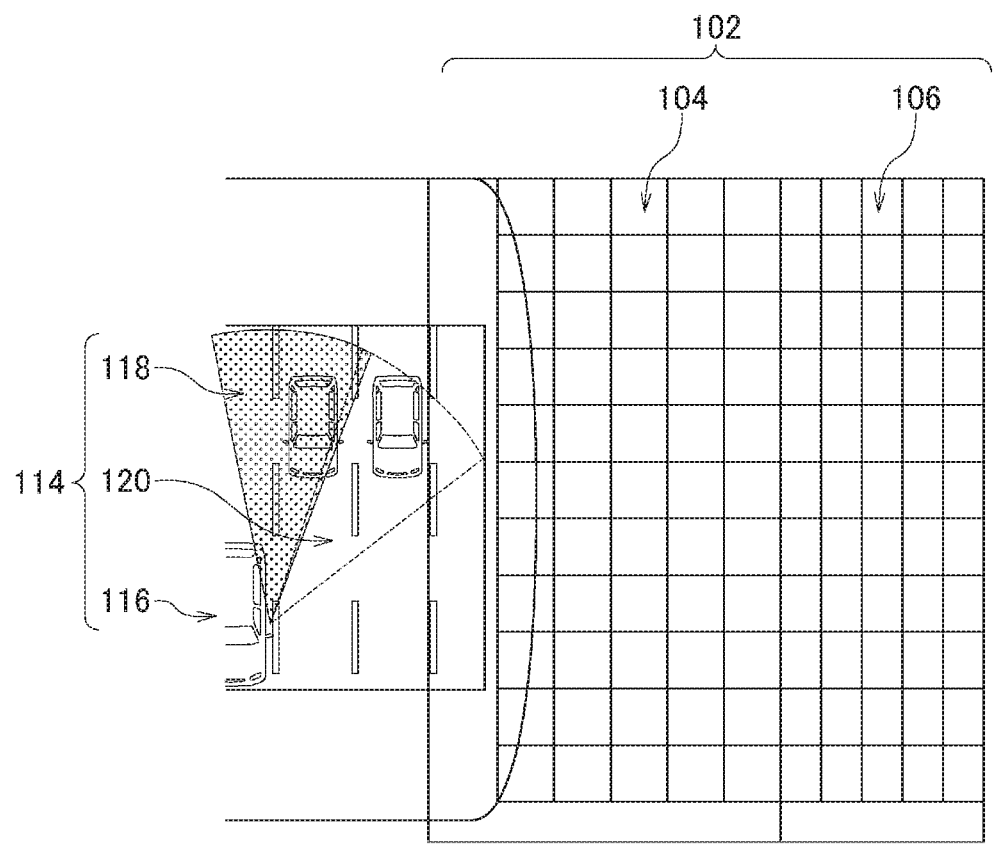
FIG. 12 is a view illustrating an example of a visual field range adjustment screen according to a modified example.
Figure 13:
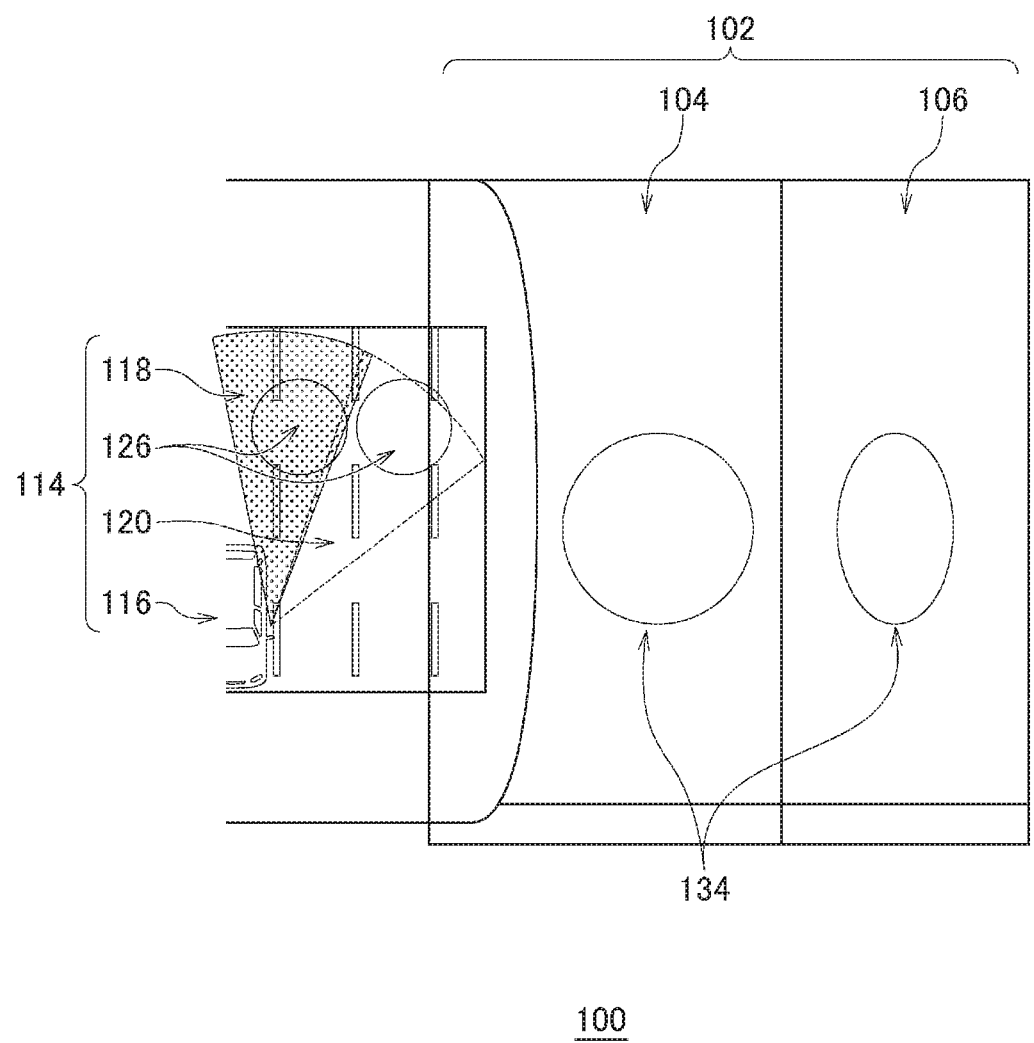
FIG. 13 is a view illustrating an example of the visual field range adjustment screen according to another modified example.

FIGS. 12 and 13 are views illustrating examples of visual field range adjustment screens 100 according to modified examples. As illustrated in FIG. 12, the generator 62 of the display control device 20 may set grids in the equal magnification area CG 104 and the rear view CG 102 (also in the bird's-eye view CG 114 even though not illustrated) and change transverse widths of the grids depending on the reduction ratio. In FIG. 12, squares of the reduction area CG 106 are reduced in the transverse direction as compared with squares of the equal magnification area CG 104, such that it is possible to allow the driver to intuitively grasp a reduction state in the display image.

In addition, as illustrated in FIG. 13, the generator 62 of the display control device 20 may set geometric figures in the equal magnification area CG 104, the reduction area CG 114, and the bird's-eye view CG 114 and change transverse widths of the geometric figures depending on the reduction ratio. The geometric figure is shown as a circle in FIG. 13, but another figure such as a square may be used. In FIG. 13, a geometric figure of the reduction area CG 106 is reduced in the transverse direction as compared with a geometric figure of the equal magnification area CG 104, such that it is possible to allow the driver to intuitively grasp a reduction state in the display image.

A second modified example will be described. The generator 62 of the display control device 20 may set the reduction range indicator 120 in the bird's-eye view CG 114 and the reduction area indicator 110 added to the reduction area CG 106 to an aspect corresponding to the reduction ratio. In other words, appearances of the reduction range indicator 120 and the reduction area indicator 110 may be changed depending on the reduction ratio. The generator 62 may set a reddish color (hue) in the reduction range indicator 120 and the reduction area indicator 110, and may change at least one of a brightness and a saturation of the reddish color depending on the reduction ratio. For example, the saturation of the reddish color may be set to be higher so that the higher the reduction ratio, the deeper the red color.

A third modified example will be described. In the above embodiment, both of the bird's-eye view CG 114 and the rear view CG 102 are displayed on the visual field range adjustment screen 100, but as a modified example, any one of the rear view CG 102 and the bird's-eye view CG 114 may be displayed on the visual field range adjustment screen 100. For example, even in a configuration in which only the bird's-eye view CG 114 is displayed on the visual field range adjustment screen 100, it is possible to support appropriate setting of the visual field range, the equal magnification display range, and the reduction display range. Even in a configuration in which only the rear view CG 102 is displayed on the visual field range adjustment screen 100, it is possible to allow the driver to intuitively grasp the visual field range, the equal magnification display range, and the reduction display range set in the adjustment mode to support determination of whether or not the setting of the visual field range is appropriate.

The display device 12 (display) described in the embodiment and the modified examples is not limited to the camera monitoring system. For example, the display device 22 (display) may be an intelligent rearview monitor system (IRMS) or may be a screen of a car navigation device.

Any combination of the embodiment and the modified examples described above is also useful as one embodiment of the present disclosure. A new embodiment resulting from the combination has an effect of each of the embodiment and the modified examples combined with each other. In addition, it will be understood by those skilled in the art that functions to be carried out by the respective components described in the claims can be realized by each of or cooperation between the components described in the embodiment and the modified examples.

Techniques described in the embodiment and the modified examples may be specified by the following:

A vehicle periphery display system including:

an image capturing device structured to capture an image of a periphery of a vehicle;

a display control device structured to generate a display image including an image obtained by reducing a predetermined range in the image captured by the image capturing device; and a display device structured to display the display image generated by the display control device, wherein in an adjustment mode, the display control device generates a computer graphics for allowing a user to set a range included in the display image and the display device displays the computer graphics, and the computer graphics indicates a first range and a second range in a range included in the display image in different aspects, the first range being displayed in a reduced state and the second range being displayed without being reduced.

According to this vehicle periphery display system, by presenting the range displayed in the reduced state in the display image and the range displayed in the display image without being reduced to the user, it is possible to support the user so that the user can appropriately set a range included in the display image.

When the computer graphics is referred to as a first computer graphics, the display control device further generates a second computer graphics based on a setting content for the first computer graphics and the display device displays the first computer graphics and the second computer graphics, and the second computer graphics includes both of an image indicating an aspect of the periphery of the vehicle corresponding to the first range in a reduced state and an image indicating an aspect of the periphery of the vehicle corresponding to the second range without reducing the aspect of the periphery of the vehicle corresponding to the second range.

According to this vehicle periphery display system, it is possible to present a content of the display image assumed depending on the setting of the user to the user, such that it is possible to support the user so that the user can appropriately set the range included in the display image.

The display control device further generates a third computer graphics indicating a host vehicle reflected in the display image and causes the first computer graphics to overlap with and be displayed on the third computer graphics.

An area indicated by the third computer graphics is an area in which a vehicle body of the host vehicle hinders a visual field in an actual display image, and an area in which the third computer graphics is not disposed is an area in which another vehicle or the like is reflected in the actual display image. By disposing the first computer graphics on the third computer graphics, the content of the display image assumed depending on the setting of the user can be presented to the user without being obstructed by the first computer graphics.

The display control device adds a first object indicating a range of the image that is reduced and a second object indicating a range of the image that is not reduced to the second computer graphics, causes the first range in the first computer graphics and the first object to be displayed in the same aspect, and causes the second range in the first computer graphic and the second object to be displayed in the same aspect.

According to this vehicle periphery display system, it is possible to allow the user to intuitively recognize that an equal magnification range in the first computer graphics and an equal magnification image in the second computer graphics correspond to each other and a reduction range in the first computer graphics and a reduced image in the second computer graphics correspond to each other.

The display control device displays the first range in the first computer graphics and the first object in an aspect corresponding to a reduction ratio.

According to this vehicle surrounding display system, it is possible to allow the user to intuitively recognize a level of the reduction ratio.

The first computer graphics includes a lane division line and another vehicle and the second computer graphics also includes a lane division line and another vehicle.

According to this vehicle periphery display system, by presenting a content reflected in an actual display image to the user, it is possible to support the user so that the user can appropriately set the range included in the display image.

When the range included in the display image set for the first computer graphics does not include a predetermined area of the periphery of the vehicle, the display control device causes the second computer graphics to be displayed in a predetermined aspect indicating a warning.

According to this vehicle periphery display system, it is possible to urge the user to set a visual field range so that a predetermined area in the periphery of the vehicle is reflected.

A vehicle periphery display system including:
an image capturing device structured to capture an image of a periphery of a vehicle;
a display control device structured to generate a display image including an image obtained by reducing a predetermined range in the image captured by the image capturing device; and
a display device structured to display the display image generated by the display control device,
wherein in an adjustment mode, the display control device allows a user to set a first range and a second range as a range included in the display image, the first range being displayed in a reduced state and the second range being displayed without being reduced, and
the display control device generates a computer graphics including both of an image indicating an aspect of the periphery of the vehicle corresponding to the first range in a reduced state and an image indicating an aspect of the periphery of the vehicle corresponding to the second range without reducing the aspect of the periphery of the vehicle corresponding to the second range, and the display device displays the computer graphics.

According to this vehicle periphery display system, by presenting a content of the display image assumed depending on the setting of the user to the user, it is possible to support the user so that the user can appropriately set the first range and the second range.

A display control device including:
an acquirer structured to acquire an image captured by an image capturing device capturing an image of a periphery of a vehicle;
a generator structured to generate a display image including an image obtained by reducing a predetermined range in the image captured by the acquirer; and
an output structured to output the display image generated by the generator to a display device,
wherein in an adjustment mode, the generator generates a computer graphics for allowing a user to set a range included in the display image and the output outputs the computer graphics to the display device, and
the computer graphics indicates a first range and a second range in a range included in the display image in different aspects, the first range being displayed in a reduced state and the second range being displayed without being reduced.

According to this display control device, by presenting the range displayed in the reduced state in the display image and the range displayed in the display image without being reduced to the user, it is possible to support the user so that the user can appropriately set a range included in the display image.

A display control device including:
an acquirer structured to acquire an image captured by an image capturing device capturing an image of a periphery of a vehicle;
a generator structured to generate a display image including an image obtained by reducing a predetermined range in the image captured by the acquirer; and
an output structured to output the display image generated by the generator to a display device,
wherein in an adjustment mode, a first range and a second range are set as a range included in the display image by a user, the first range being displayed in a reduced state and the second range being displayed without being reduced, and the generator generates a computer graphics including both of an image indicating an aspect of the periphery of the vehicle corresponding to the first range in a reduced state and an image indicating an aspect of the periphery of the vehicle corresponding to the second range without reducing the aspect of the periphery of the vehicle corresponding to the second range, and the output outputs the computer graphics to the display device.

According to this display control device, by presenting a content of the display image assumed depending on the setting of the user to the user, it is possible to support the user so that the user can appropriately set the first range and the second range.

A computer program causing a computer to execute the following processes of:

acquiring an image captured by an image capturing device capturing an image of a periphery of a vehicle;

generating a display image including an image obtained by reducing a predetermined range in the captured image;

outputting the generated display image to a display device; and generating a computer graphics for allowing a user to set a range included in the display image in an adjustment mode and outputting the computer graphics to the display device, wherein the computer graphics indicates a first range and a second range in a range included in the display image in different aspects, the first range being displayed in a reduced state and the second range being displayed without being reduced.

According to this computer program, by presenting the range displayed in the reduced state in the display image and the range displayed in the display image without being reduced to the user, it is possible to support the user so that the user can appropriately set a range included in the display image.

A computer program causing a computer to execute the following processes of:

acquiring an image captured by an image capturing device capturing an image of a periphery of a vehicle;

generating a display image including an image obtained by reducing a predetermined range in the captured image; and outputting the generated display image to a display device, wherein in an adjustment mode, the computer allows a user to set a first range and a second range as a range included in the display image, the first range being displayed in a reduced state and the second range being displayed without being reduced, and the computer program causes the computer to further execute a process of generating a computer graphics including both of an image indicating an aspect of the periphery of the vehicle corresponding to the first range in a reduced state and an image indicating an aspect of the periphery of the vehicle corresponding to the second range without reducing the aspect of the periphery of the vehicle corresponding to the second range and outputting the computer graphics to the display device.

According to this computer program, by presenting a content of the display image assumed depending on the setting of the user to the user, it is possible to support the user so that the user can appropriately set the first range and the second range.

What is claimed is:

1. A vehicle periphery display system comprising:
an image capturing device structured to capture an image of a periphery of a vehicle;
a display controller structured to generate a display image including a first image obtained by compressing a first predetermined range and a second image obtained without compressing a second predetermined range in the image captured by the image capturing device; and
a display structured to display the display image generated by the display controller,
wherein in an adjustment mode, the display controller generates computer graphics ("CG") for allowing a user to set a range included in the display image and the display displays the computer graphics,
wherein the computer graphics include a compression range indicator being a first CG image indicating a first range in a bird's-eye view form, an equal magnification range indicator being a second CG image indicating a second range in the bird's-eye view form, and a host vehicle indicator being a third CG image indicating a host vehicle reflected in the display image, the first range and the second range in a range included in the display image in different aspects, the first range being displayed in a compressed state and the second range being displayed without being compressed, and
wherein when an operation to change a ratio between the first range of the compression range indicator being displayed in a compressed state and the second range of the equal magnification range indicator without being compressed by adjusting the first range of the compression range indicator and the second range of the equal magnification range indicator on the computer graphics which is displayed in the bird's eye view form is input, a ratio between the first predetermined range and the second predetermined range in the display image generated by the display controller is changed based on the operation.

2. The vehicle periphery display system according to claim 1, wherein when the computer graphics is referred to as a first computer graphics, the display controller further generates a second computer graphics based on a setting content for the first computer graphics and the display displays the first computer graphics and the second computer graphics, and
the second computer graphics includes both of an image indicating an aspect of the periphery of the vehicle corresponding to the first range in a compressed state and an image indicating an aspect of the periphery of the vehicle corresponding to the second range without compressing the aspect of the periphery of the vehicle corresponding to the second range.

3. The vehicle periphery display system according to claim 2, wherein the display controller adds a first object indicating a range of the image that is compressed and a second object indicating a range of the image that is not compressed to the second computer graphics, causes the first range in the first computer graphics and the first object to be displayed in the same aspect, and causes the second range in the first computer graphic and the second object to be displayed in the same aspect.

4. The vehicle periphery display system according to claim 3, wherein the display controller displays the first range in the first computer graphics and the first object in an aspect corresponding to a compression ratio.

5. The vehicle periphery display system according to claim 2, wherein the first computer graphics includes a lane division line and another vehicle and the second computer graphics also includes a lane division line and another vehicle.

6. The vehicle periphery display system according to claim 2, wherein when the range included in the display image set for the first computer graphics does not include a predetermined area of the periphery of the vehicle, the display controller causes the second computer graphics to be displayed in a predetermined aspect indicating a warning.

7. The vehicle periphery display system according to claim 1, wherein the compression range indicator is a fan-shaped image and the equal magnification range indicator is a fan-shaped image.

8. A vehicle periphery display system comprising:
an image capturing device structured to capture an image of a periphery of a vehicle;
a display controller structured to generate a display image including a first image obtained by compressed a first predetermined range and a second image obtained without compressing a second predetermined range in the image captured by the image capturing device; and
a display structured to display the display image generated by the display controller,
wherein in an adjustment mode, the display controller allows a user to set a first range and a second range as a range included in the display image, the first range being displayed in a compressed state and the second range being displayed without being compressed,
wherein the display controller generates computer graphics ("CG") including both of an image indicating an aspect of the periphery of the vehicle corresponding to the first range in a compressed state and an image indicating an aspect of the periphery of the vehicle corresponding to the second range without compressing the aspect of the periphery of the vehicle corresponding to the second range, and the display displays the computer graphics,
wherein the computer graphics include a compression range indicator being a first CG image indicating the first range in a bird's-eye view form, an equal magnification range indicator being a second CG image indicating the second range in the bird's-eye view form, and a host vehicle indicator being a third CG image indicating a host vehicle reflected in the display image, and
wherein when an operation to change a ratio between the first range of the compression range indicator being displayed in a compressed state and the second range of the equal magnification range indicator without being compressed by adjusting the first range of the compression range indicator and the second range of the equal magnification range indicator on the computer graphics which is displayed in the bird's eye view form is input, a ratio between the first predetermined range and the second predetermined range in the display image generated by the display controller is changed based on the operation.

9. The vehicle periphery display system according to claim 8, wherein the compression range indicator is a fan-shaped image and the equal magnification range indicator is a fan-shaped image.

10. A display control device comprising:
an acquirer structured to acquire an image captured by an image capturing device capturing an image of a periphery of a vehicle;
a generator structured to generate a display image including a first image obtained by compressing a first predetermined range and a second image obtained without compressing a second range in the image captured by the acquirer; and
an output structured to output the display image generated by the generator to a display,
wherein in an adjustment mode, the generator generates computer graphics "CG") for allowing a user to set a range included in the display image and the output outputs the computer graphics to the display,
wherein the computer graphics include a compression range indicator being a first CG image indicating a first range in a bird's-eye view form, an equal magnification range indicator being a second CG image indicating a second range in the bird's-eye view form, and a host vehicle indicator being a third CG image indicating a host vehicle reflected in the display image, the first range and the second range in a range included in the display image in different aspects, the first range being displayed in a compressed state and the second range being displayed without being compressed, and
wherein when an operation to change a ratio between the first range of the compression range indicator being displayed in a compressed state and the second range of the equal magnification range indicator without being compressed by adjusting the first range of the compression range indicator and the second range of the equal magnification range indicator on the computer graphics which is displayed in the bird's eye view form is input, a ratio between the first predetermined range and the second predetermined range in the display image generated by the display controller is changed based on the operation.

11. The display control device according to claim 10, wherein the compression range indicator is a fan-shaped image and the equal magnification range indicator is a fan-shaped image.

12. A display control device comprising:
an acquirer structured to acquire an image captured by an image capturing device capturing an image of a periphery of a vehicle;
a generator structured to generate a display image including a first image obtained by compressing a first predetermined range and a second image obtained without compressing a second range in the image captured by the acquirer; and
an output structured to output the display image generated by the generator to a display,
wherein in an adjustment mode, a first range and a second range are set as a range included in the display image by a user, the first range being displayed in a compressed state and the second range being displayed without being compressed,
wherein the generator generates computer graphics ("CG") including both of an image indicating an aspect of the periphery of the vehicle corresponding to the first range in a compressed state and an image indicating an aspect of the periphery of the vehicle corresponding to the second range without compressing the aspect of the periphery of the vehicle corresponding to the second range, and the output outputs the computer graphics to the display,
wherein the computer graphics include a compression range indicator being a first CG image indicating the first range in a bird's-eye view form, an equal magnification range indicator being a second CG image indicating the second range in the bird's-eye view form, and a host vehicle indicator being a third CG image indicating a host vehicle reflected in the display image, and wherein when an operation to change a ratio between the first range of the compression range indicator being displayed in a compressed state and the second range of the equal magnification range indicator without being compressed by adjusting the first range of the compression range indicator and the second range of the equal magnification range indicator on the computer graphics which displays a is displayed in the bird's eye view form is input, a ratio between the first predetermined range and the second predetermined range in the display image generated by the display controller is changed based on the operation.

13. The display control device according to claim 12, wherein the compression range indicator is a fan-shaped image and the equal magnification range indicator is a fan-shaped image.

14. A non-transitory recording medium storing a computer program, the computer program causing a computer to execute the following processes:

acquiring an image captured by an image capturing device capturing an image of a periphery of a vehicle;

generating a display image including a first image obtained by compressing a first predetermined range and a second image obtained without compressing a second range in the captured image;

outputting the generated display image to a display; and generating computer graphics ("CG") for allowing a user to set a range included in the display image in an adjustment mode and outputting the computer graphics to the display, wherein the computer graphics include a compression range indicator being a first CG image indicating a first range in a bird's-eye view form, an equal magnification range indicator being a second CG image indicating a second range in the bird's-eye view form, and a host vehicle indicator being a third CG image indicating a host vehicle reflected in the display image, the first range and the second range in a range included in the display image in different aspects, the first range being displayed in a compressed state and the second range being displayed without being compressed, and wherein when an operation to change a ratio between the first range of the compression range indicator being displayed in a compressed state and the second range of the equal magnification range indicator without being compressed by adjusting the first range of the compression range indicator and the second range of the equal magnification range indicator on the computer graphics which is displayed in the bird's eye view form is input, a ratio between the first predetermined range and the second predetermined range in the display image generated by the display controller is changed based on the operation.

15. The non-transitory recording medium storing a computer program according to claim 14, wherein the compression range indicator is a fan-shaped image and the equal magnification range indicator is a fan-shaped image.

16. A non-transitory recording medium storing a computer program, the computer program causing a computer to execute the following processes:

acquiring an image captured by an image capturing device capturing an image of a periphery of a vehicle;

generating a first display image including an image obtained by compressing a predetermined range in the captured image and a second image obtained without compressing a second range; and outputting the generated display image to a display, wherein in an adjustment mode, the computer allows a user to set a first range and a second range as a range included in the display image, the first range being displayed in a compressed state and the second range being displayed without being compressed, wherein the computer program causes the computer to further execute a process of generating computer graphics ("CG") including both of an image indicating an aspect of the periphery of the vehicle corresponding to the first range in a compressed state and an image indicating an aspect of the periphery of the vehicle corresponding to the second range without compressing the aspect of the periphery of the vehicle corresponding to the second range and outputting the computer graphics to the display, wherein the computer graphics include a compression range indicator being a first CG image indicating the first range in a bird's-eye view form, an equal magnification range indicator being a second CG image indicating the second range in the bird's-eye view form, and a host vehicle indicator being a third CG image indicating a host vehicle reflected in the display image, and wherein when an operation to change a ratio between the first range of the compression range indicator being displayed in a compressed state and the second range of the equal magnification range indicator without being compressed by adjusting the first range of the compression range indicator and the second range of the equal magnification range indicator on the computer graphics which is displayed in the bird's eye view form is input, a ratio between the first predetermined range and the second predetermined range in the display image generated by the display controller is changed based on the operation.

17. The non-transitory recording medium storing a computer program according to claim 16, wherein the compression range indicator is a fan-shaped image and the equal magnification range indicator is a fan-shaped image.

* * * * *